(12) United States Patent
Jaggi et al.

(10) Patent No.: US 7,574,518 B2
(45) Date of Patent: Aug. 11, 2009

(54) SYSTEM AND METHOD FOR COMPUTING LOW COMPLEXITY ALGEBRAIC NETWORK CODES FOR A MULTICAST NETWORK

(75) Inventors: Sidharth Jaggi, Pasadena, CA (US); Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 10/601,691

(22) Filed: Jun. 23, 2003

(65) Prior Publication Data

US 2005/0010675 A1   Jan. 13, 2005

(51) Int. Cl.
   *G06F 15/16* (2006.01)
(52) U.S. Cl. ...................... 709/234; 709/230
(58) Field of Classification Search ............... 709/223, 709/224, 232, 234, 235, 233, 230
   See application file for complete search history.

(56) References Cited

U.S. PATENT DOCUMENTS

| | | | |
|---|---|---|---|
| 5,926,101 | A | 7/1999 | Dasgupta |
| 6,046,978 | A | 4/2000 | Melnik |
| 6,757,738 | B1 | 6/2004 | Cao et al. |
| 6,778,518 | B2 | 8/2004 | Jesse et al. |
| 6,798,765 | B2 | 9/2004 | Larsson |
| 2005/0013253 | A1 | 1/2005 | Lindskog et al. |
| 2007/0094181 | A1 * | 4/2007 | Tayebnejad et al. ........... 706/21 |

OTHER PUBLICATIONS

R. K. Ahuja, T. I. Magnanti, and J. B. Orlin, "Some Recent Advances in Network Flows", SIAM Review, vol. 33, pp. 175-219, 1991.

R. Ahlswede, N. Cai, S.-Y. R. Li, and R. W. Yeung, "Network Information Flow", IEEE Transactions on Information Theory, IT-46, pp. 1204-1216, 2000.

Ralf Koetter and Muriel Médard; "Beyond routing: An algebraic approach to network coding." In Proceedings of the 21st Annual Joint Conference of the IEEE Computer and Communications Societies (INFOCOMM)., vol. 1, pp. 122-130, 2002.

Bloom, B., Space/time trade-offs in hash coding with allowable errors, Commun. ACM, Jul. 1970, pp. 422-426, vol. 13, No. 7.

Lee, S.-J., M. Gerla, and C.-C. Chiang, On-demand multicast routing protocol, Proc. IEEE Wireless Comm. and Networking Conf. (WCNC'99), Sep. 1999, pp. 1298-1302, New Orleans, Louisiana, U.S.A.

Mitzenmacher, M., Compressed bloom filters, IEEE/ACM Transactions on Networking, 2002, vol. 10, No. 5, pp. 604-612.

* cited by examiner

*Primary Examiner*—Jeffrey Pwu
*Assistant Examiner*—Benjamin R Bruckart
(74) *Attorney, Agent, or Firm*—Lyon & Harr, LLP; Mark A. Watson

(57) ABSTRACT

A "multicast code constructor" facilitates network based coding in a multicast environment by determining efficient codes for optimizing network flows, thereby increasing reliable network throughput. The network code constructor processes incoming data at each node on a byte-by-byte level to produce outgoing packets to each node in the network. Network coding is provided in which arithmetic operations can occur in any finite field with more than N-1 elements, where N represents the number of receivers in the network. Further, the complexity of arithmetic employed by the coder is independent of the network capacity, and dependent only on the number of receivers in the network. In addition, in one embodiment, multicast codes are restricted to the portion of the network obtained by a union of unicast flows from a sender node to each receiver node to produce codes which do not flood the network excessively, thereby producing a lower code design complexity.

15 Claims, 9 Drawing Sheets

CHOOSING A LINEAR COMBINATION OF $v_1, ..., v_k$ NOT IN THE SPAN OF ANY $S_1, ..., S_k$

800 — Input:
- $R$-dimensional vector $v_i$, and
- set of $R-1$ $R$-dimensional vectors $S_i$, for $i = 1,...,k$

810 — Denote by L the vector space spanned by $v_i$, for $i = 1,...,k$. Compute the set of vectors $v_i$, for $i = 1,...,k'$, spanning L. k' is less than or equal to k. Renumber the indices if needed.

820 — For $j = 1,...,k$
By Gaussian elimination compute a vector $Z_j$ in L such that for any vector y in $S_j$, $y.S_j = 0$.

830 — Now we have to find a vector v in L such that $v.Z_j$ is not zero for
$j = 1,...,k$.
Assume vectors $Z_j$, $j = 1,...,k''$ are linearly independent and all other $Z_j$, $j = k''+1,...,k$ can be written as linear combinations of these. Renumber the indices if needed.

840 — Find $c_j$, $j = 1,...,k''$ by solving the following system of linear equations which gives v (*See FIG. 9*).

$$v.Z_j = c_j, \quad j = 1,...,k''.$$

Note that the solution to the above set of equations may not be unique and one of the solutions can be calculated by Gaussian elimination.

850 — Output:
- $R$-dimensional vector $v = \Sigma_{i=1}^{k} \beta_i v_i$, and
- k coefficients $\beta_1, ..., \beta_k$

SYSTEM AND METHOD FOR COMPUTING LOW COMPLEXITY ALGEBRAIC NETWORK CODES FOR A MULTICAST NETWORK

BACKGROUND

1. Technical Field

The invention is related to automatically optimizing network coding, and in particular, to a system and method for performing network coding at nodes in the network along transmission paths between senders and receivers for increasing an amount of information that can be reliably broadcast from a sender to a collection of receivers through the network.

2. Related Art

In general, a multicast network can be described as a network with directed edges. There are a number of existing schemes for routing network flows in an attempt to optimize the capacity of such networks.

For example, one conventional scheme has demonstrated that if coding is allowed at internal nodes in a network, then the multicast capacity is in general higher than if no such coding is allowed. Further, this scheme has also demonstrated the existence of multicast codes that would achieve a natural upper bound on a multicast capacity by applying a max-flow min-cut theorem to the network between a sender and a number of receivers. Unfortunately, the results offered by this scheme depend on random coding arguments without providing any construction techniques for practical multicast codes.

Another fairly recently offered scheme for coding acyclic networks has demonstrated a connection between algebraic geometry and network coding. This network coding scheme examined the performance of codes where nodes are allowed to group together incoming bits into blocks of a predetermined length, m. The resulting symbols are then treated as elements in a finite field having a size of $2^m$. This scheme then performs a linear combination on the symbols in the finite field to produce outgoing symbols which are elements in a finite field. Decoding at receiver nodes is also a linear operation over the finite field on the incoming symbols. This scheme also provides techniques for examining multicast scenarios, such as, for example, certain edge failure patterns may occur, networks with delay, and other special encoding scenarios (such as when all sources wish to transmit all their information to all sinks in the network).

However, this scheme for coding acyclic networks has several drawbacks. For example, where N represents a number of receivers in the network and C represents a cutset capacity of the network, the solution to the multicast problem requires a field size q for the network codes to be larger then NC. This number quickly becomes impractically large for arithmetic implementation as the size of N and C increase. Further, the resulting codes would involve "flooding" the network, thereby likely using more network edges than would otherwise be necessary for the same or greater network capacity.

Therefore, what is needed is a system and method for coding networks that overcomes the disadvantages of the aforementioned schemes. For example, such a system and method should provide construction techniques for practical multicast codes. Further, these multicast code construction techniques should limit the complexity of network coding, even on large networks, such that any arithmetic computations are feasible. Finally, the resulting network codes should avoid flooding of the network in order to optimize capacity.

SUMMARY

A "multicast network code constructor," or simply "network code constructor," as described herein, provides a system and method for facilitating network based coding in a multicast environment by constructing efficient multicast network codes for optimizing network flows, thereby increasing reliable network throughput. In general, the network codes are used to process incoming data at each node on a byte-by-byte level to produce outgoing packets to each neighboring node in the multicast network. The network code constructor provides for multicast network coding, or simply "network coding," in which arithmetic operations can occur in any finite field with more than N−1 elements, where N represents the number of receivers in the network. Further, the complexity of arithmetic employed by the network code constructor is independent of the network capacity, and dependent only on the number of receivers in the network. In addition, in one embodiment, multicast network codes are restricted to the portion of the network obtained by a union of unicast flows from a sender node to each receiver node to produce codes which do not flood the network excessively, and thus have an associated lower design complexity.

The multicast networks described herein are understood to be defined as networks with directed edges that are assumed to be error-free, with a single sender of information s wishing to transmit the same information to N receivers $\mathcal{R}=\{r_1, r_2, \ldots, r_N\}$. However, it should be noted that while the descriptions of the network code constructor provided herein are explained in the context of an analysis of multicast networks over directed acyclic graphs with zero-delay edges, the ideas described herein are easily extensible to robust network codes, more general encoding scenarios, and networks with delays.

The network code constructor provides an efficient coding process in which arithmetic operations can occur in any finite field with more than N−1 elements. Thus the complexity of arithmetic is independent of the capacity of the network, and dependent only on the number of receivers. The coding design process described herein provides a solution to a multicast network coding problem, wherein the complexity of the solution is dominated by the time complexity of running a maximum flow algorithm N times, plus $O(N(N+C)^3|E|)$ operations over any finite field with more than N−1 elements, where E represents the number of edges.

In general, the network code constructor can be simply described as a system and method for computing a linear network code. Computing the network code is accomplished by first computing flows between at least one sender and two or more receivers given capacities on each network edge. Next, given the computed flows, network node coefficients are then computed directly from the computed flows to provide an efficient and computationally inexpensive network is coding, relative to conventional network coding schemes.

In particular, the network code constructor facilitates network based coding in a multicast environment by determining efficient codes for optimizing network flows. This process begins by using known parameters of the network, including, for example, information describing a sender, S, receivers, $r_i$ and each internal node in the network, along with the flow capacity (edges) of each of these network elements. These parameters are then used to reduce the network to a form that is more conducive to analysis. In particular, the network is reduced to a network whose edges have unit capacities by replacing each edge having a capacity c with c edges having unit capacity.

Following this reduction of the network, a conventional max-flow algorithm is used to determine the multicast capacity C from the sender to the receivers. Then, given this multicast capacity C, along with the known network parameters, the network code constructor constructs multicast network codes by computing a flow of rate $R \leq C$ from the sender to each receiver, and from these flows directly computes encoding vectors and decoding matrices for transmitting symbols from the sender to the receivers across the network, and then decoding those symbols at each receiver.

In addition to the just described benefits, other advantages of the system and method for automatically determining efficient codes for optimizing network flows will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

FIG. 8 illustrates an exemplary system flow diagram for automatically computing encoding vectors for every edge of a multicast network.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
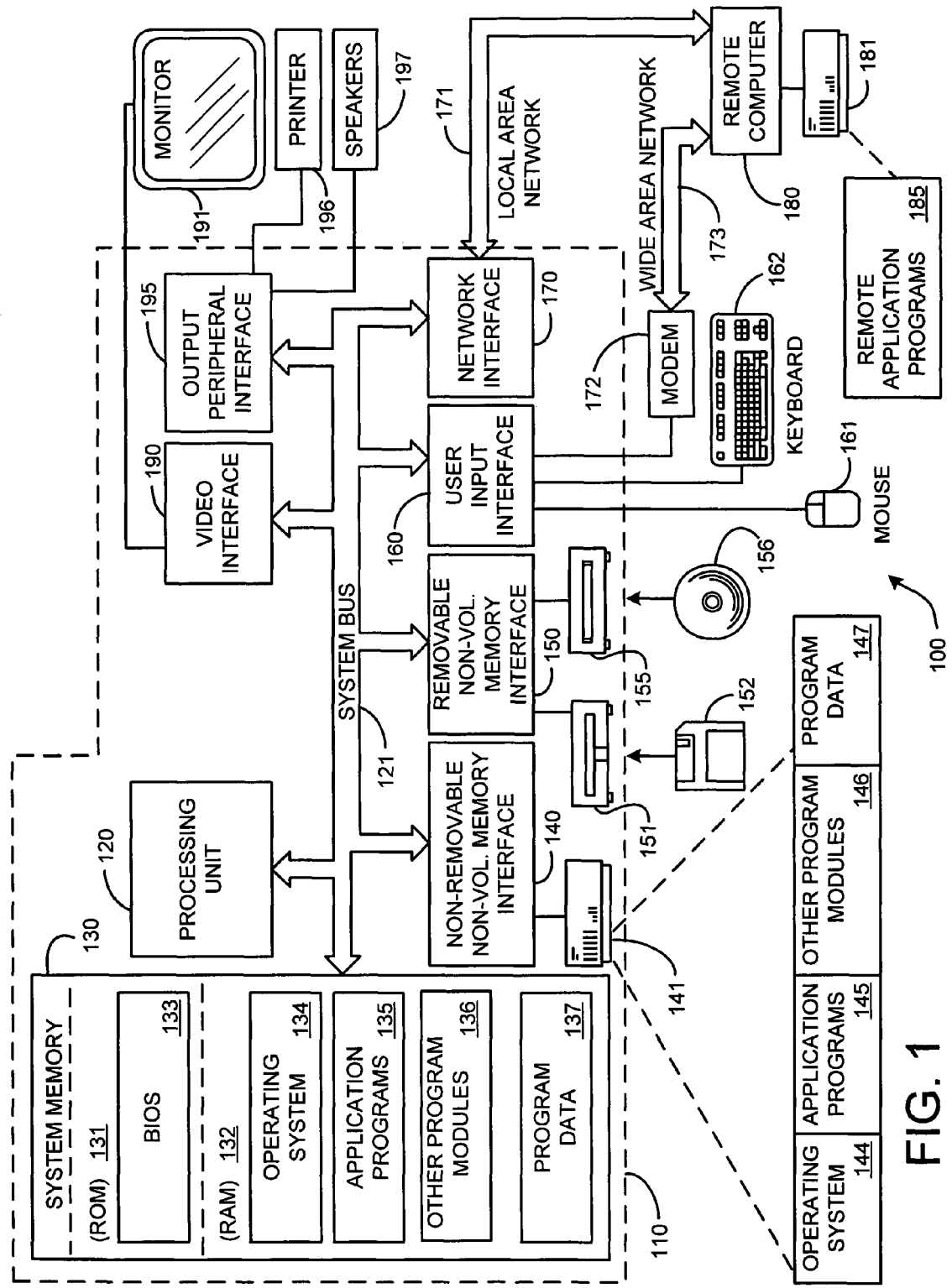
FIG. 1 is a general system diagram depicting a general-purpose computing device constituting an exemplary system for automatically facilitating network based coding in a multicast environment by determining efficient codes for optimizing network flows.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a microphone, joystick, game pad, satellite dish, scanner, radio receiver, and a television or broadcast video receiver, or the like. These and other input devices are often connected to the processing unit 120 through a user input interface 160 that is coupled to the system bus 121, but may be connected by other interface and bus structures, such as, for example, a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatically determining efficient codes for optimizing network flows.

2.0 Introduction:

A "multicast network code constructor," or simply a "network code constructor," as described herein, provides a system and method for facilitating network based coding in a multicast environment by computing efficient multicast network codes for optimizing network flows, thereby increasing reliable network throughput. In general, the multicast network codes are used to process incoming data at each node on a byte-by-byte level to produce outgoing packets to each neighboring node in the multicast network. The network code constructor provides for multicast network coding, or simply "network coding," in which arithmetic operations can occur in any finite field with more than N−1 elements, where N represents the number of receivers in the network. Further, the complexity of arithmetic employed by the multicast network code constructor is independent of the network capacity, and dependent only on the number of receivers in the network. In addition, in one embodiment, multicast network codes are restricted to the portion of the network obtained by a union of unicast flows from a sender node to each receiver node to produce codes which do not flood the network excessively, and thus have an associated lower design complexity.

The multicast networks described herein are understood to be defined as networks with directed edges that are assumed to be error-free, with a single sender of information s wishing to transmit the same information to N receivers $\mathcal{R}=\{r_1, r_2, \ldots, r_N\}$). However, it should be noted that while the descriptions of the network code constructor provided herein are explained in the context of an analysis of multicast networks over directed acyclic graphs with zero-delay edges, the ideas described herein are easily extensible to robust network codes, more general encoding scenarios, and networks with delays.

The network code constructor provides an efficient coding process in which arithmetic operations can occur in any finite field with more than N−1 elements. Thus the complexity of arithmetic is independent of the capacity of the network, and dependent only on the number of receivers. The coding design process described herein provides a solution to a multicast network coding problem, wherein the complexity of the solution is dominated by the time complexity of running a maximum flow algorithm N times, plus $O(N(N+C)^3|E|)$ operations over any finite field with more than N−1 elements, where E represents the number of edges.

In general, the network code constructor can be simply described as a system and method for computing a linear network code. Computing the multicast network code is accomplished by first computing flows between at least one sender and two or more receivers given capacities on each network edge. Next, given the computed flows, network node coefficients are then computed directly from the computed flows to provide an efficient and computationally inexpensive network coding, relative to conventional network coding schemes.

2.1 System Overview:

In general, the network code constructor operates by computing network codes for a known network, having senders and receivers of known flow capacity. The following section briefly describes the general operation of the multicast network code constructor in terms of an architectural flow diagram that illustrates general functional elements of the network code constructor.

Figure 2:
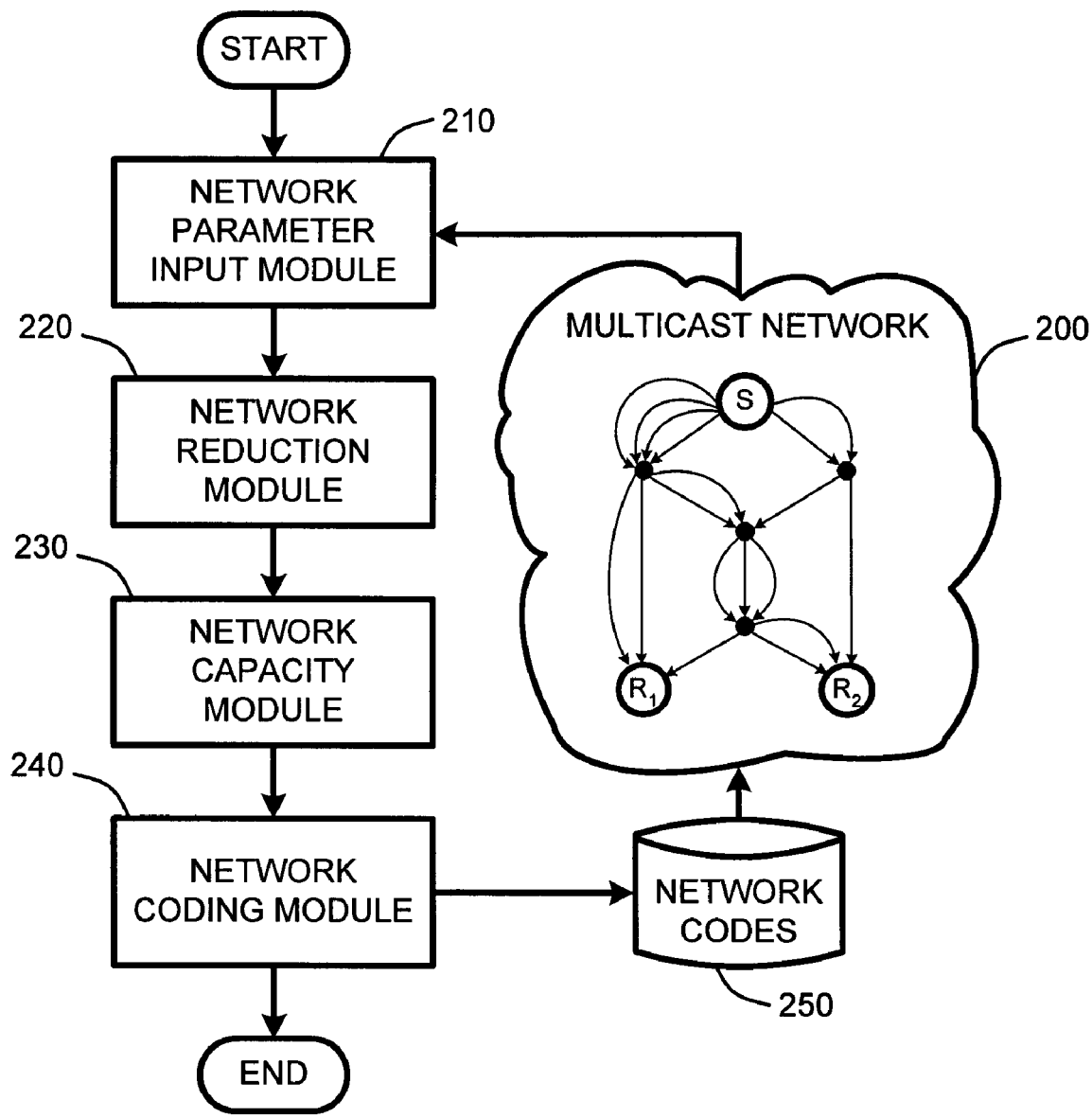
FIG. 2 illustrates an exemplary architectural diagram showing exemplary program modules for automatically facilitating network based coding in a multicast environment by determining efficient codes for optimizing network flows.

2.2 System Architecture:

The processes summarized above are illustrated by the general system diagram of FIG. 2. In particular, the system diagram of FIG. 2 illustrates interrelationships between program modules for implementing a "multicast network code constructor" for facilitating network based coding in a multicast environment by computing efficient multicast codes for optimizing network flows. As shown in FIG. 2, the multicast network is presented as a directed acyclic graph (DAG) 200 having zero-delay edges. However, as described in detail below, the ideas described herein are easily extensible to robust network codes, more general encoding scenarios, and networks with delays.

As illustrated by FIG. 2, a network code constructor for computing efficient multicast codes for optimizing network flows begins by inputting known parameters of the network 200 into a network parameter input module 210. These parameters include information describing the sender, S, each receiver, $R_1$ and $R_2$, each internal node in the network, and each edge in the network along with capacities on each edge. The network parameter input module 210 then provides these parameters to a network reduction module 220. The network reduction then reduces the network to a form that is more conducive to analysis. In particular, the network $\mathcal{G}$ 200 is reduced to a network whose edges have unit capacities by replacing each edge having a capacity c with c edges having unit capacity.

Following the reduction of the network, a network capacity module 230 uses a conventional max-flow algorithm to determine a maximum flow $C_i$ from the sender to each receiver $R_i$. The multicast capacity C of the network is the minimum value of these maximum flows, i.e., $C=\min_i C_i$. Given a transmission rate R less than or equal to this multicast capacity C, the next step is to compute encoding vectors and decoding matrices for transmitting symbols at rate R from the sender the receivers across the network, and then decoding those symbols at each receiver. These codes are computed by a network coding module 240 given the network parameters and the transmission rate R. Once computed, these codes 250 are stored for use in transmitting, coding and decoding symbols on the network 200.

3.0 Operation Overview:

The above-described program modules are employed in a multicast network code constructor for facilitating network based coding in a multicast environment by computing efficient codes for optimizing network flows. The following sections provide a detailed operational discussion of exemplary methods for implementing the aforementioned program modules. In particular, the following description provides a discussion of initial definitions and background for explaining the network code constructor. Following these definitions and background, several theorems underlying the implementation of the network code constructor are provided for purposes of explanation. Finally, an overall summary of the system is presented in terms of a general system flow diagram.

3.1 Definitions:

The following discussion provides a description of definitions and assumptions used in implementing the network code constructor with respect to an acyclic network. As noted above, the descriptions of the network code constructor described herein are explained in the context of an analysis of multicast networks over directed acyclic graphs with zero-delay edges. A network is called cyclic if it contains directed cycles; otherwise it is called acyclic.

In particular, in the following discussion, a network is represented by a directed acyclic graph (DAG) $\mathcal{G}=(V,E)$ with a vertex set V and edge set E. All edges are directed, and multiple edges are allowed between two vertices. The vertex which is at the head of an edge e shall be denoted by head(e), and the vertex at the tail by tail(e). The in-degree of a vertex v is defined as the number of edges e' such that head (e')=v, and is denoted by $\Gamma(v)$. The set of edges incoming to a vertex v is the set of all edges e such that head(e)=v, and the incoming edges are denoted by $\{e_1^{in}(v), e_2^{in}(v) e_{\Gamma(v)}^{in}(v)\}$. Each edge $e \in E$ is assumed to have integer edge capacity and be delay-free. Note that as is well understood by those skilled in the art, by choosing a sufficiently large unit of time, any network can be approximated to an arbitrary degree of accuracy by a network with edges having integer capacities.

For purposes of explanation, the following discussion describes the network code constructor in multicast networks, i.e., networks that have a single source vertex s and N receiver vertices or nodes $\mathcal{R}=\{r_1,r_2,\ldots,r_N\}$. Statistically, at every unit of time i, the source vertex s produces R binary random variables $\{b_{i,j}\}_{j=1}^{R}$ such that $\{b_{i,j}\}$ are independently and indistinguishably distributed (i.i.d.) with Bernoulli(½) for all $i \in \{0,1,\ldots\}$, and $j \in \{1,2,\ldots,R\}$. Further, for every group of m time units $\{im, im+1, \ldots, im+m-1\}$ the network codes described herein group together the m bits $\{b_{im,j}, b_{im+1,j}, \ldots, b_{im+m-1,j}\}$ to obtain R symbols $\{X_{i,j}\}_{j=1}^{R}$ in a finite field, $\mathbb{F}_{2^m}$, where m is some integer whose value will be fixed later. In addition, in order to simplify the notation in the following discussion, each edge is broken up into parallel edges with the unit capacity of 1 bit per unit time. However, it should be appreciated by those skilled in the art that the network coding methods described herein are equally applicable to any capacity of U bits per unit time. Therefore over m time units, each edge of the network has the capacity to transmit m bits of information, or equivalently, 1 symbol from the finite field $\mathbb{F}_{2^m}$.

Therefore, in view of the preceding discussion, the network coding problem can be described as involving the transmission of the $\{X_{i,j}\}_{j=1}^{R}$ symbols in m consecutive time units $\{0,1, \ldots, m-1\}$ over the edges of the network, to replicate $\{X_{0,j}\}_{j=1}^{R}$ symbols at vertex v for every vertex $v \in \mathcal{R}$. The identical process is then used for each successive block of m time units. Therefore, in order to again simplify the notation for purposes of discussion, the time index, i, will be dropped from the notation such that symbols are denoted as $\{X_j\}_{j=1}^{R}$. Further, again for purposes of explanation, it is assumed that all edges are synchronized with respect to symbol timing, and that edges $\{e_{-1}, e_{-2}, \ldots, e_{-R}\}$ are appended to the network such that head($e_{-j}$)=s for all j e∈ $\{1, 2, \ldots, R\}$.

Thus, a symbol $Y(e_{-j})$ transmitted over edge $e_{-j}$ is denoted by the symbol $X_j$. Further, the symbol transmitted over any other edge e in the network, denoted by Y(e), is a function only of the symbols on edges incoming to tail(e). Therefore, for each edge e, a Γ(tail(e))-length combination vector is defined as $\beta(e)=(\beta_1(e), \beta_2(e), \ldots, \beta_{\Gamma(tail(e))}(e))$ to be associated with e. These combination vectors, β(e), represent encoding vectors for each edge of the network. The network $\mathcal{G}$ is said to be a $IF_{2^m}$-linear network if for all edges $e \in E$, the symbol Y(e) on an edge $e \in E$ can be written as:

$$Y(e) = \beta(e)(Y(e_1^{in}(tail(e))), Y(e_2^{in}(tail(e))), \ldots, Y(e_{\Gamma(tail(e))}^{in}(tail(e))))^T \quad \text{Eqn. 1}$$

for some encoding vector β(e) whose entries are elements of $IF_{2^m}$, where $e_1^{in}(v), \ldots, e_{\Gamma(v)}^{in}(v)$ denote the edges incoming to a vertex v. These vectors β(e) can be taken to be time-varying or time-invariant, and the network is accordingly either a "time-varying" or "time-invariant" network. The following discussion concentrates on time invariant networks for purposes of explanation; however, the multicast network code constructor is clearly not limited to time-invariant networks, as it can easily be applied to time-varying networks.

Furthermore, each edge e is associated with an R-length representation vector η(e), such that $$\eta(e) = \beta(e) \begin{pmatrix} \eta(e_1^{in}(tail(e))) \\ \eta(e_2^{in}(tail(e))) \\ \vdots \\ \eta(e_{\Gamma(tail(e))}^{in}(tail(e))) \end{pmatrix} \quad \text{Eqn. 2}$$

In addition, for each $j \in \{1, 2, \ldots, R\}$, $\eta(e_{-j})$ is initialized as an R-length vector with 1 in the $j^{th}$ position and 0 everywhere else. Consequently, because of the directed acyclic nature of $\mathcal{G}$, this initialization makes η(e) well defined for each $e \in \mathcal{N}$. Further, by using this definition η(e), it can be seen that if the symbol $Y(e_{-j})$ being transmitted over edge $e_{-j}$ equals the symbol $X_j$, then the symbol being transmitted over edge e equals $$Y(e) = \eta(e)(X_1, X_2, \ldots, X_R)^T \quad \text{Eqn. 3}$$

Thus, the representation vector η(e) on edge e shows how the symbol Y(e) on edge e is represented in terms of the original source symbols.

Further, for each receiver $r_i$, R distinct Γ($r_i$)-length decoding vectors $\{\epsilon(r_i, j)\}_{j=1}^{R}$ are defined to be associated with $r_i$. The entries of $\epsilon(r_i, j)$ are elements of $IF_{2^m}$. Again, for purposes of explanation, the following discussion is restricted to the case where decoding operations also involve only linear combinations of the incoming symbols, as illustrated by Equation (4). However, as should be appreciated by those skilled in the art, the network code constructor described herein is also applicable to non-linear combinations of the incoming symbols.

$$\hat{X}(r_i, j) = \epsilon(r_i, j)(Y(e_1^{in}(r_i)), Y(e_2^{in}(r_i)), \ldots, Y(e_{\Gamma(tail(e))}^{in}(r_i)))^T \quad \text{Eqn. 4}$$

For a given network $\mathcal{G}$, the multicast network coding problem is defined as a 4-tuple $(\mathcal{G}, s, \mathcal{R}, R)$. Further, it is desired to choose appropriate β(e) and $\epsilon(r_i, j)$ so that the symbols can be decoded perfectly, i.e., $\hat{X}(r_i, j) = X_j$, for each receiver $r_i \in \mathcal{R}$ and for each block of m consecutive time units. If such β(e) and $\epsilon(r_i, j)$ exist in a suitably chosen field $IF_{2^m}$, then the network $\mathcal{G}$ is said to be "$IF_{2^m}$-linearly solvable with multicast rate R", and the β(e) and $\epsilon(r_i, j)$ comprise the solution.

Next, for the communication network $\mathcal{G}$, a cut between two vertices v and v' is defined as a partition of the vertex set V into two sets S and $S^c = V - S$ such that $v \in S$ and $v' \in S^c$. The value V(S) of the cut is defined to be equal to the number of edges going from S to $S^c$.

3.2 Theorems:

The following paragraphs describe several theorems that are utilized in formulating the derivation of algebraic network codes as provided by the network code constructor described herein.

3.2.1 Theorem 1—Min-Cut Max-Flow:

The well known conventional "Min-Cut Max-Flow theorem" is described by L. R. Ford, Jr., and D. R. Fulkerson in "Maximal Flow Through a Network", *Canadian Journal of Mathematics*, 8, pp. 99-404, 1956. This Min-Cut Max-Flow theorem guarantees that for N=1, (that is, if there is only one receiver $r_i$ in the network) the network problem is solvable if and only if R is less than or equal to $C_i$, the minimum value of all cuts between s and $r_i$. In particular, the Min-Cut Max-Flow theorem in network coding states that the network problem $(\mathcal{G}, s, r_i, R)$ is solvable if and only if $R \leq C_i = \min_{S: s \in S, r_i \in S^c} V(S)$.

A number of low time-complexity schemes have been devised based on the Min-Cut Max-Flow theorem for finding solutions to network coding problems. In general, such schemes are commonly referred to as "maximum flow algorithms." A number of these maximum flow schemes are described by: R. K. Ahuja, T. I. Magnanti, and J. B. Orlin, in "Some Recent Advances in Network Flows", *SIAM Review*, vol. 33, pp. 175-219, 1991. The network code constructor described herein makes use of such a maximum flow algorithm in a pre-processing stage.

Fort example, in a conventional maximum flow algorithm, a directed path $P = \{e_1, e_2, \ldots, e_n\}$ between s and $r_i$ comprises an ordered set of edges from E such that tail($e_1$)=s, head($e_n$)=$r_i$, and head($e_i$)=tail($e_{i+1}$). A set of C edge-disjoint directed paths $P_i$ between s and $r_i$ comprises C directed paths $\{P_{i,j}\}$ between s and $r_i$ such that no two paths share any edge in common, although sharing of vertices is allowed. Conventional maximum flow algorithms provide a means of finding $C_i$ edge-disjoint directed paths between s and $r_i$. In other words, these conventional maximum flow algorithms are used to find a solution for the network in which every coefficient in all the β(e) and all the $\epsilon(r_i, j)$ are either 0 or 1.

3.2.2 Theorem 2—Network Multicast Theorem:

For the multicast network coding problem, let C be the minimum over all i and all cuts between s and $r_i$, that is, $$C = \min_{i} \min_{S: s \in S, r_i \in S^c} V(S) \quad \text{Eqn. 5}$$

In accordance with the conventional network multicast theorem described by R. Ahlswede, N. Cai, S.-Y. R. Li, and R. W. Yeung, in "Network Information Flow", *IEEE Transactions on Information Theory*, IT-46, pp. 1204-1216, 2000, the multicast network coding problem $(\mathcal{G}, s, \mathcal{R}, R)$ is solvable if and only if $R \leq C$. One direction of the network multicast theorem (solvability of the network implies $R \leq C$) is a direct consequence of the conventional Min-Cut Max-Flow theorem. The other direction requires more work. Proofs of this conventional theorem are provided by R. Ahlswede, N. Cai, S.-Y. R. Li, and R. W. Yeung, "Network Information Flow", *IEEE Transactions on Information Theory*, IT-46, pp. 1204-1216, 2000; and by R. Koetter, and M. Medard, in "An Algebraic Approach to Network Coding", presented at INFOCOM 2002 (http://www.mit.edu/people/medard/pub.htm).

3.2.3 Theorem 3—Network Multicast Algorithm:

A conventional network multicast algorithm is described by R. Koetter, and M. Medard, in "An Algebraic Approach to Network Coding", presented at INFOCOM 2002 (http://www.mit.edu/people/medard/pub.htm). In that description, Koetter, and Medard explain that the multicast network coding problem ($\mathcal{G}$,s,$\mathcal{R}$,R), with R≦C, is "$IF_{2^m}$-linearly solvable" with multicast rate R if $m=\lceil \log_2(NC+1) \rceil$.

While the network multicast algorithm described by Koetter and Medard is useful, a reduction in the field size, as accomplished by the network code constructor, as described herein serves to increase network throughput without flooding the network.

3.2.4 Theorem 4—Improved Network Multicast Algorithm:

The network code constructor described herein provides an improved network multicast algorithm that provides for multicast network coding in which arithmetic operations can occur in any finite field with more than N−1 elements, where N represents the number of receivers in the network.

In particular, as described in detail below, the network code constructor described herein demonstrates that the network coding problem ($\mathcal{G}$,s,$\mathcal{R}$,R), with R≦C (Theorems 1 and 2), is "$IF_{2^m}$-linearly solvable" with multicast rate R if $m=\lceil \log_2 N \rceil$. This is a significantly smaller field size than has been demonstrated by any other conventional method. Clearly the advantages of a smaller field size include decreased computational requirements, fewer symbols, and greater network throughput.

Thus, the remainder of this description of the network code constructor assumes R≦C(Theorems 1 and 2) and that m equals $\lceil \log_2 N \rceil$. In particular, Let the flow to $r_i$, $\mathcal{P}_i = \{P_{i,j}\}_{j=1}^R$ be a set consisting of R edge-disjoint directed paths $P_{i,j}$ between s and $r_i$. A network flow $\mathcal{N}(R)$ between s and $\mathcal{R}$ is defined as the union of the edges in the flows to each of the receivers, i.e., $\mathcal{N}(R)=\{e \in E : \exists P_{i,j}, e \in P_{i,j}\}$. The directed acyclic nature of $\mathcal{G}$ induces a total order<on the edges in $\mathcal{N}(R)$ such that for any edges e and e', head(e)=tail(e') implies e<e'.

3.3 Multicast algorithm for Zero Delay Directed Acyclic Graphs:

In view of the definitions and theorems provided above, the processes utilized by the network code constructor can now be described. In particular, the following paragraphs describe the multicast network code design computed by the network code constructor in terms of algorithm inputs, algorithm outputs, preprocessing, calculation of encoding vectors β(e) for every edge e of the multicast network, and calculation of decoding vectors ε($r_i$,j) for decoding symbols multicast from the sender to each receiver. In general, the encoding vectors comprise a multicast network encoder, and the decoding vectors comprise a multicast network decoder. The multicast network encoder and the multicast network decoder are collectively referred to as a "multicast network coder." Further, the term "multicast network code" is used to refer to the collection of encoding vectors on each edge, and decoding matrices at each receiver.

3.3.1 Code Design:

The input needed by the network code constructor is simply the aforementioned 4-tuple ($\mathcal{G}$,s,$\mathcal{R}$,R), namely a DAG $\mathcal{G}$, labeled with edge capacities, the sender node s, receiver nodes $\mathcal{R}$, and the multicast rate R. As described in detail below, given this 4-tuple input, the network code constructor outputs encoding vectors β(e) for every edge e in the network, along with decoding vectors $\{\epsilon(r_i,j)\}_{j=1}^R$ for use in multicasting symbols from the sender and decoding those symbols at each receiver.

Figure 3:
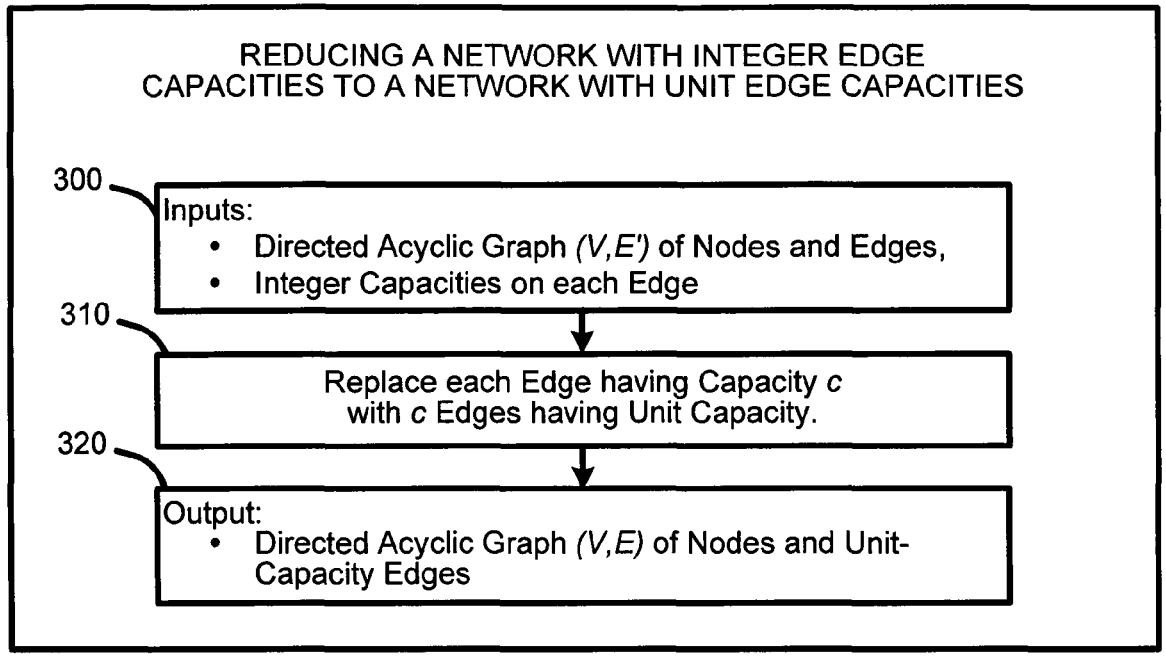
FIG. 3 illustrates an exemplary system flow diagram for automatically reducing a network with integer edge capacities to a network with unit edge capacities.

As illustrated by FIG. 3, the network $\mathcal{G}$ is a DAG having known nodes and edges 300, with integer capacities on each edge. The first step in determining codes for the network is to reduce the network to a form that is more conducive to analysis. In particular, the network $\mathcal{G}$ is reduced to a network whose edges have unit capacities by replacing each edge having a capacity c with c edges having unit capacity 310, and output 320 for use in determining network codes.

Figure 4:
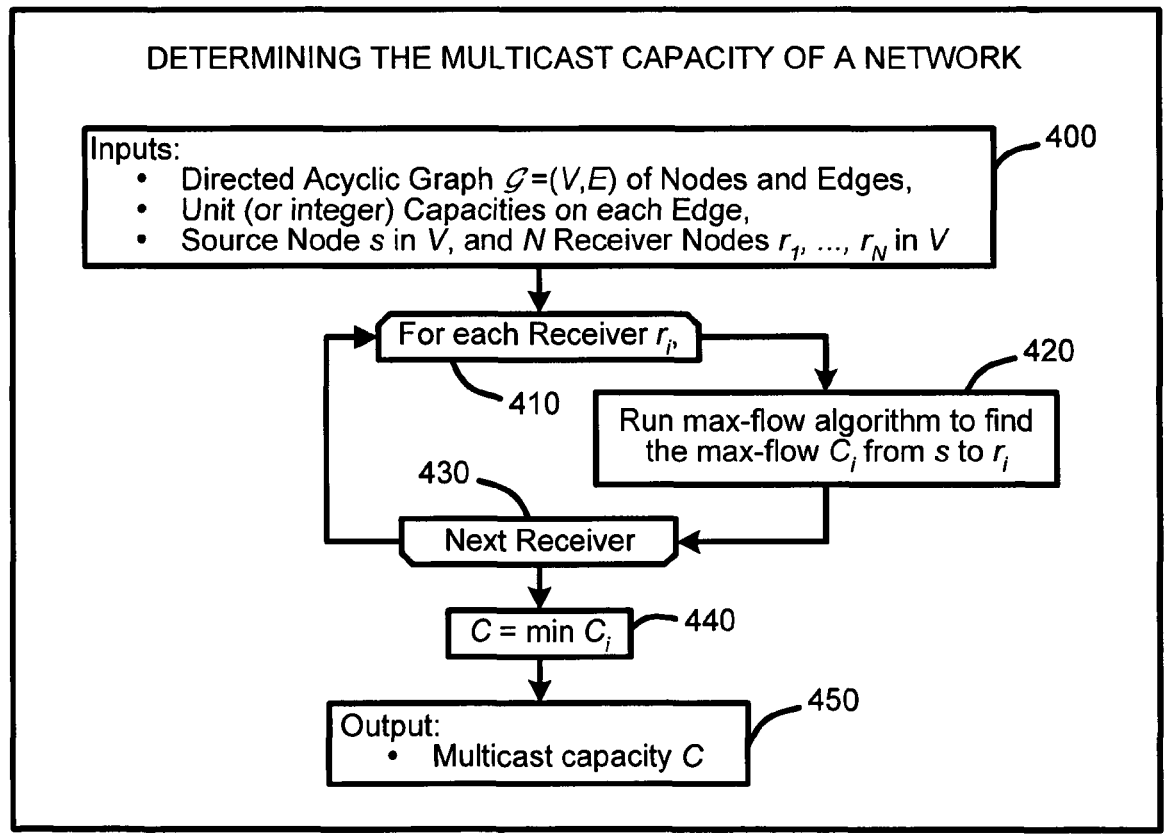
FIG. 4 illustrates an exemplary system flow diagram for automatically determining a multicast capacity of a network.

Next, any conventional low time-complexity maximum flow algorithm, as noted above in Section 3.2.1, is run N times (once for each receiver node) to obtain a network flow $\mathcal{N}(R)$ between the sender s and the set of receivers R. In particular, as illustrated by FIG. 4, the network $\mathcal{G}$ 400 having c edges with unit capacity output as illustrated by FIG. 3, is used as in input for determining the multicast capacity of the network. Specifically, for each receiver node $r_i$, a conventional max-flow algorithm is used to find the max-flow $C_i$ from the sender node s, to $r_i$ 420. After the max-flow $C_i$ each receiver node $r_i$ is computed 420, i is incremented for selecting the next receiver 430.

This process (steps 410 through 430) repeats until all N receiver nodes have been processed. At that time, the multicast capacity C of the network between s and $\mathcal{R}$ is determined by simply identifying the minimum of the $C_i$ values computed for each of the N receiver nodes 440. This minimum of the $C_i$ values is then output 450 as the multicast capacity C of the network between s and $\mathcal{R}$.

3.3.2 Computing Encoding Vectors:

Given the network $\mathcal{G}$ with unit capacity edges, and the multicast capacity C of the network between s and $\mathcal{R}$, the next step is to choose a transmission rate R≦C, and to compute a flow $\mathcal{P}_i$ consisting of R edge-disjoint paths $P_{i,j} \in \mathcal{P}_i$ from s to each $r_i$ in $\mathcal{R}$. Note that the resulting network flow $\mathcal{N}(R)$ will restrict the network code to utilize only edges in $\mathcal{N}(R)$, rather than possibly all edges in E. The next step is then to determine encoding vectors, β($e_t$), and decoding vectors, η($e_t$), for the multicast network. In general, this is accomplished by finding β($e_t$) and η($e_t$) for $t \in \{1, \ldots, |\mathcal{N}(R)|\}$. At each step t, a frontier edge set for receiver $r_i$ at step t is defined as an ordered subset $\mathcal{F}_i^{(t)}$ of R edges from $\mathcal{P}_i$ such that the $j^{th}$ edge is the edge $e_{t'}$ in the $j^{th}$ path $P_{i,j} \in \mathcal{P}_i$ with the largest t' less than or equal to t. A frontier edge set matrix for receiver $r_i$ at step t is an R×R matrix $F_i^{(t)}$ whose rows are the representation vectors η($e_t$) for the edges in $\mathcal{F}_i^{(t)}$.

Therefore for each step t, there are k (not necessarily distinct) edges $\{e_{t_1}, e_{t_2}, \ldots, e_{t_k}\}$ in the frontier edge sets $\{\mathcal{F}_{i_1}^{(t-1)}, \mathcal{F}_{i_2}^{(t-1)}, \ldots, \mathcal{F}_{i_k}^{(t-1)}\}$, such that at step t the network code constructor replaces the edges $\{e_{t_1}, e_{t_2}, \ldots, e_{t_k}\}$ in the frontier edge sets in which they appeared with et, to obtain the updated frontier edge sets. The network code constructor then calculates for $e_t$ an encoding vector, β($e_t$), and Equation (2) is used to obtain the vector η($e_t$). The frontier edge set matrices $\{F_{i_1}^{(t-1)}, F_{i_2}^{(t-1)}, \ldots, F_{i_k}^{(t-1)}\}$ are also updated by replacing the vectors $\{η(e_{t_1}), η(e_{t_2}), \ldots, η(e_{t_k})\}$ with η($e_t$). In particular, the encoding vector, β($e_t$) is chosen to be any combination vector so that $$\forall i \in \{1,2,\ldots,N\}, \text{rank}(\mathcal{F}_i^{(t)})=R \qquad \text{Eqn. 6}$$

The step-counter t is then incremented by 1 and this procedure repeats until $t=|\mathcal{N}(R)|$. Once this procedure has been completed, each frontier edge set $\mathcal{F}_i^{(|\mathcal{N}(R)|)}$ consists only of edges e such that head(e)=$r_i$, and consequently, all encoding vectors, β(e), have been determined.

Note that for purposes of explanation, a proof that β($e_t$)'s can be chosen to satisfy Equation (6) is provided in the following paragraphs, along with a more detailed explanation of the computation of the encoding vectors, β(e).

In particular, the existence of β(e)'s that satisfy Equation (6) is demonstrated in accordance with the following discussion. Specifically, for all $i \in \{1,2,\ldots,k\}$ let $M_i$ be arbitrary non-singular n×n matrices over the finite field $IF_q$. Further, for all $i \in \{1,2,\ldots,k\}$, let $v_i$ be some row vector of $M_i$. Let $\mathcal{L}$ be any subspace of $(IF_q)^n$ containing the span of $\{v_1, \ldots, v_k\}$. Finally, for all $i \in \{1,2,\ldots,k\}$, let $S_i$ be the linear span of all the row vectors of $M_i$ except $v_i$, i.e. $S_i = \text{span}\{\text{rows}(M_i) - v_i\}$.

Given the above definitions, it is shown below that if $k \leq q$, then there exists $v \in \mathcal{L}$ such that for all $i \in \{1,2,\ldots,k\}$, $S_i \oplus v = (IF_q)^n$. Specifically, it should be noted that $\mathcal{L} - \cup_{i=1}^{k} S_i$ equals $\mathcal{L} - \cup_{i=1}^{k} (\mathcal{L} \cap S_i)$, and that by using a counting argument on the set $\mathcal{L} - \cup_{i=1}^{k}(\mathcal{L} \cap S_i)$ the required result is obtained.

In particular, let $d(\mathcal{L})$ be the dimension of the vector space $\mathcal{L}$. Therefore, the number of vectors in $\mathcal{L}$ equals $q^{d(\mathcal{L})}$. For each $i \in \{1,2,\ldots,k\}$, the dimension of the vector space $(\mathcal{L} \cap S_i)$ is strictly less than $d(\mathcal{L})$, since $\mathcal{L}$ contains at least one vector, $v_i$, which is not contained in $S_i$. Therefore, for each $i \in \{1,2,\ldots,k\}$ the number of vectors in $\mathcal{L} \cap S_i$ equals at most $q^{d(\mathcal{L})-1}$. In addition, each $\mathcal{L} \cap S_i$ contains the zero vector, and therefore the total number of vectors in $\cup_{i=1}^{k}(\mathcal{L} \cap S_i)$ is no more than $k(q^{d(\mathcal{L})-1}-1)+1$. Since $k \leq q$, this quantity is strictly less than the number of vectors in $\mathcal{L}$, $q^{d(\mathcal{L})}$. Therefore $|\mathcal{L} - \cup_{i=1}^{k} S_i| > 0$, which implies the existence of $v \in \mathcal{L}$ such that $v \notin S_i$ for any $i \in \{1,2,\ldots,k\}$. This observation provides the desired result. In fact, the converse is also true, in the sense that it is possible to construct $q+1$ subspaces $S_i$ such that $\cup_{i=1}^{q+1} S_i = (IF_q)^n$, and therefore there is no vector v with the desired properties.

Further, by extension, a corollary to the above proof is provided to show that for all $e \in \mathcal{N}(R)$, there exists a β(e) such that Equation (6) is satisfied. In particular, set n=R and $q=2^m$. Let edges $\{e_{t_1}, e_{t_2}, \ldots, e_{t_k}\}$ be the edges in the frontier edge sets $\{\mathcal{F}_{i_1}^{(t-1)}, \mathcal{F}_{i_2}^{(t-1)}, \ldots, \mathcal{F}_{i_k}^{(t-1)}\}$, which are replaced at step t by $e_t$. Then $M_j = F_{i_j}^{(t-1)}$ for $j \in \{i_1, i_2, \ldots, i_k\}$. Finally, let $\mathcal{L}$ be the span of $\{\eta(e_i^{in}(\text{tail}(e_t)))\}_{i=1}^{\Gamma(e)}$.

Given the above proofs, and general description of the computation of the encoding vectors, β(e,), an algorithm on the order $O((R+r)^3 r)$ is provided for finding β($e_t$)'s for any edge $e_t \in \mathcal{N}(R)$. Specifically, let $v_i$, $S_i$, $\mathcal{L}$, $d(\mathcal{L})$, and $S_i$ be as defined in the preceding paragraphs. Then, given inputs of row vectors $\{v_i\}_{i=1}^{k}$ and (R-1)×R matrices $\{S_i\}_{i=1}^{k}$, outputs of row vectors v are computed by the multicast network encoder such that $v \in \mathcal{L}$, $v \notin S_i$ for any $i \in \{1,2,\ldots,k\}$, along with row vector $\beta = (\beta_1, \beta_2, \ldots, \beta_k)$ such that $v = \Sigma_{i=1}^{k} \beta_i v_i$.

In particular, let L be a $d(\mathcal{L})$×R matrix whose rows form a basis for $\mathcal{L}$. For each $i \in \{1,2,\ldots,k\}$, it is possible (by row operations on L and the matrix $S_i$) to obtain the $(d(\mathcal{L})-1)$×$d(\mathcal{L})$ matrix $B_i$ whose rows form a basis for $\mathcal{L} \cap S_i$ in the coordinate system given by the rows of L. For each i, a $d(\mathcal{L})$-length column vector $z_i$ is identified, called the zero vector of $\mathcal{L} \cap S_i$ in $(IF_q)^n$, such that for any vector y' in the span of the rows of $B_i$, $y' \cdot z_i^T = 0$. To obtain such a vector, row operations on are performed on $B_i$ until it contains the $(d(\mathcal{L})-1) \times (d(L\mathcal{L})-1)$ identity sub-matrix and a $(d(\mathcal{L})-1)$-length column vector $z_i'$. $z_i^T \cdot z_i$ then equals the row vector obtained by adjoining the element 1 to $-z_i'$, i.e., $z_i = (-z_i'^T, 1)$.

A $d(\mathcal{L})$-length row vector y is then identified such that $$y \cdot z_i \neq 0 \text{ for any } i \in \{1,2,\ldots,k\}, \qquad \text{Eqn. 7}$$

and an R-length vector v=yL is identified in $\mathcal{L}$ such that $v \notin \mathcal{L} \cap S_i$ for any $i \in 1,2,\ldots,k$. Given such a v, $\beta_t$ is easily computed by a process of Gaussian elimination. A vector $y=(y_1, y_2, \ldots, y_{d(\mathcal{L})})$ satisfying Equation (7) can be obtained via a "greedy algorithm" as described below for use in computing $\beta_t$.

3.3.3 Greedy Algorithm:

A "greedy algorithm" for computing the vector $y=(y_1, y_2, \ldots, y_{d(\mathcal{L})})$ satisfying Equation (7) operates by first denoting a $k \times d(\mathcal{L})$ matrix whose $i^{th}$ row vector is $z_i^T$ by Z. Without loss of generality, let the first rank(Z) rows of Z be linearly independent, and denote this rank(Z)×d($\mathcal{L}$) sub-matrix by $Z_I$. Further, denote the matrix consisting of the remaining rows of Z by $Z_D$. Therefore $Z_D$ can be written as the matrix product $TZ_I$, for some (k-rank(Z))×rank(Z) matrix T. The greedy algorithm described herein computes a rank(Z)-length column vector c such that any vector y satisfying $Z_I y^T = c$ satisfies Equation (7).

In the first step of the greedy algorithm some arbitrary value $c_1 \neq 0$ (such as, for example, $c_1 = 1$) is chosen. Now there are two possibilities—either the rank(Z)=1, or it is greater than 1 (it cannot be zero, since all the row vectors of Z are non-zero). If rank(Z)=1, c is assigned the value (1). If rank(Z)>1, more work is needed to calculate c. For notational convenience the $i^{th}$ row vector of the matrix T is denoted by $(T)_i$, and the $(i,j)^{th}$ element by $(T)_{i,j}$. Consider all row vectors $(T)_i$ of T which have non-zero elements only in the first ctr positions, and denote them by the superscript ctr, as $(T)_i^{ctr}$, where ctr is a counter that is initialized to 2. The greedy algorithm proceeds inductively in the variable ctr and at each step of ctr computes a constant, $c_{ctr} \in IF_{2^m}$, such that $$(Z_I)_{ctr} y^T = c_{ctr} \neq 0 \qquad \text{Eqn 8}$$

is true. To choose this value $c_{ctr}$ it is noted that $$(Z_D)_i^{ctr} y^T \neq 0 \Leftrightarrow (Z_I)_{ctr} y \neq -(T)_{i,ctr}^{-1} \left( \sum_{j=1}^{ctr-1} (T)_{i,j} (Z_I)_j \right) y^T \qquad \text{Eqn. 9}$$

$$\Leftrightarrow (Z_I)_{ctr} y \neq -(T)_{i,ctr}^{-1} \sum_{j=1}^{ctr-1} (T)_{i,j} c_j = d_{i,ctr}$$

where the $d_{i,ctr}$ are some constants in $IF_{2^m}$. But since rank(Z)>1, there are at most k-2 row vectors in $Z_D$. However, since $k \leq q = 2^m$, there are at most $2^m - 2$ different values of $d_{i,ctr}$ for a fixed value of ctr. Therefore there exists at least one $c_{ctr}$ such that $(Z_I)_{ctr} y^T = c_{ctr}$ does not contradict Equation (8). This process is continued until ctr=rank(Z), at which point under-determined linear equations $Z_I y^T = (c_1, c_2, \ldots, c_{rank(Z)})^T = c$. are produced. Therefore choosing any pseudo-inverse $Z_I^{-1}$ of $Z_I$ and evaluating $Z_I^{-1} c^T$ gives a $y^T$ such that the column vector $Zy^T$ has no zero elements.

3.3.4 Computing Decoding Vectors:

After computing the encoding vectors, β(e), as described above, the decoding vectors, $\epsilon(r_i, j)$, are then computed as described below. In particular, for all $i \in \{1,2,\ldots,N\}$, $j \in \{1,2,\ldots R\}$, $\epsilon(r_i, j)$ is chosen as the $j^{th}$ row of the matrix $(F_i^{\mid \mathcal{N}(R) \mid})^{-1}$. This definition is well-defined since by assumption, as discussed above in Section 3.3.1, the frontier edge set matrices are invertible. Therefore, for any receiver $r_i$:

$$\begin{pmatrix} \hat{X}(r_i, 1) \\ \hat{X}(r_i, 2) \\ \vdots \\ \hat{X}(r_i, R) \end{pmatrix} = (F_i^{\{|N(R)|\}})^{-1} \begin{pmatrix} Y(e_1^{in}(r_i)) \\ Y(e_2^{in}(r_i)) \\ \vdots \\ Y(e_R^{in}(r_i)) \end{pmatrix} \qquad \text{Eqn. 10}$$

$$= (F_i^{\{|N(R)|\}})^{-1}(F_i^{\{|N(R)|\}}) \begin{pmatrix} X_1 \\ X_2 \\ \vdots \\ X_B \end{pmatrix}$$

$$= \begin{pmatrix} X_1 \\ X_2 \\ \vdots \\ X_B \end{pmatrix}$$

where the equalities follow from the definitions of the decoding and representation vectors described herein.

3.4 System Operation:

The processes described above are illustrated in the sequence of system flow diagrams provided as FIG. 5 through FIG. 10. This processes depicted in these figures are provided for purposes of illustration, and are intended merely to illustrate one way of implementing the network code constructor. Clearly, in light of the description provided herein, there are a number of ways for computing codes for a multicast network, and the network code constructor is not intended to be limited to the processes illustrated by FIG. 5 through FIG. 10.

Figure 5:
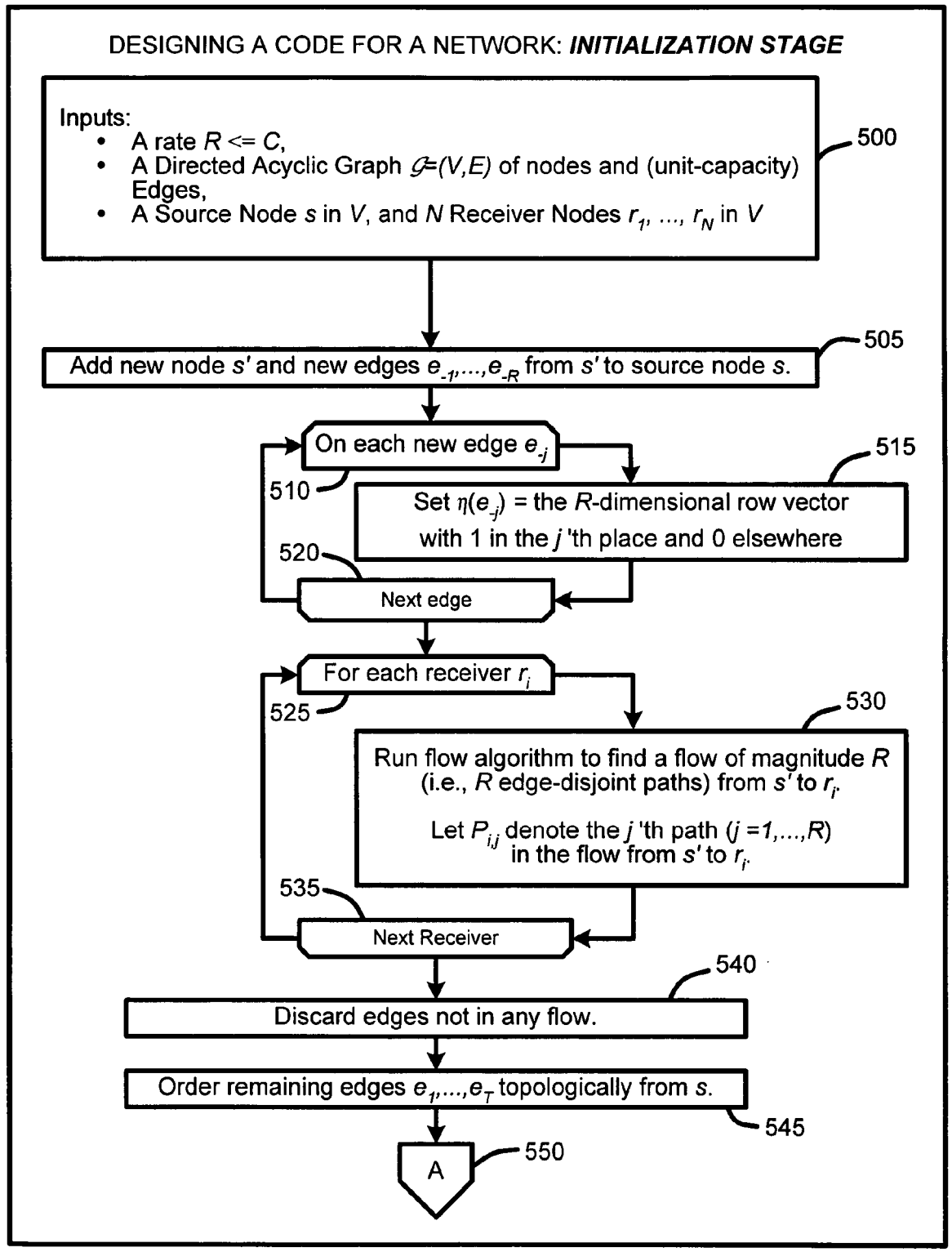
FIG. 5 illustrates an exemplary system flow diagram of an initialization stage for automatically designing a code for a network.

3.4.1 Computing the Network Code:

As illustrated by FIG. 5, in computing codes for multicast networks, the first step is to provide several inputs that define the multicast network to the network code constructor. As illustrated by FIG. 5, these inputs 500 to the network code constructor include a directed acyclic graph $\mathcal{G}$, which has been reduced to unit capacity edges (see FIG. 3 and associated discussion). In addition, the inputs to the network multicast coder also include a transmission rate R that is less than or equal to the maximum multicast capacity C of the multicast network (see FIG. 4 and associated discussion). Finally, the inputs to the network multicast coder include a known source node s, and known receiver nodes $r_i$ of the multicast network.

Given these inputs, the first step is to initialize the network code constructor as illustrated by the steps shown in FIG. 5. In particular, once the aforementioned inputs have been provided, the first step is to create a new node denoted by s', and new edges denoted by $e_{-1}, \ldots, e_{-R}$ from s' to the known source node s 505. Next, for each edge 510, $e_{-j}$, an R-length representation vector $\eta(e_{-j})$ (where, as described above, R represents the transmission rate) is set equal to the R-dimensional row vector, with 1 in the $j^{th}$, and 0 otherwise 515. After $\eta(e_{-j})$ is set for each edge, $e_{-j}$, j is incremented for selecting the next edge 520. In other words, for each $j \in \{1,2, \ldots, R\}$, $\eta(e_{-j})$ is initialized as an R-length vector with 1 in the $j^{th}$ position and 0 everywhere else. As noted above, because of the directed acyclic nature of $\mathcal{G}$, this initialization makes $\eta(e)$ well defined for each $e \in \mathcal{N}$. This process (steps 510 through 520) repeats until all j edges for s' have been processed.

Next, for each receiver 525, $r_i$, a conventional flow algorithm is used to compute a flow of magnitude R (i.e., R edge-disjoint paths) from s' to $r_i$ 530. After the flow is computed 530 for each receiver $r_i$, i is incremented for selecting the next receiver 535. This process (steps 525 through 535) repeats until all i receivers have been processed. Next, any edges not in the flow are simply discarded 540. In other words, any node having excess capacity will have edges that are not utilized. These unutilized edges are discarded 540 for purposes of computing multicast network codes. Finally, the remaining edges, $e_1, \ldots, e_T$, are ordered topologically from s 545. This step completes the initialization stage of the network code constructor.

Figure 6:
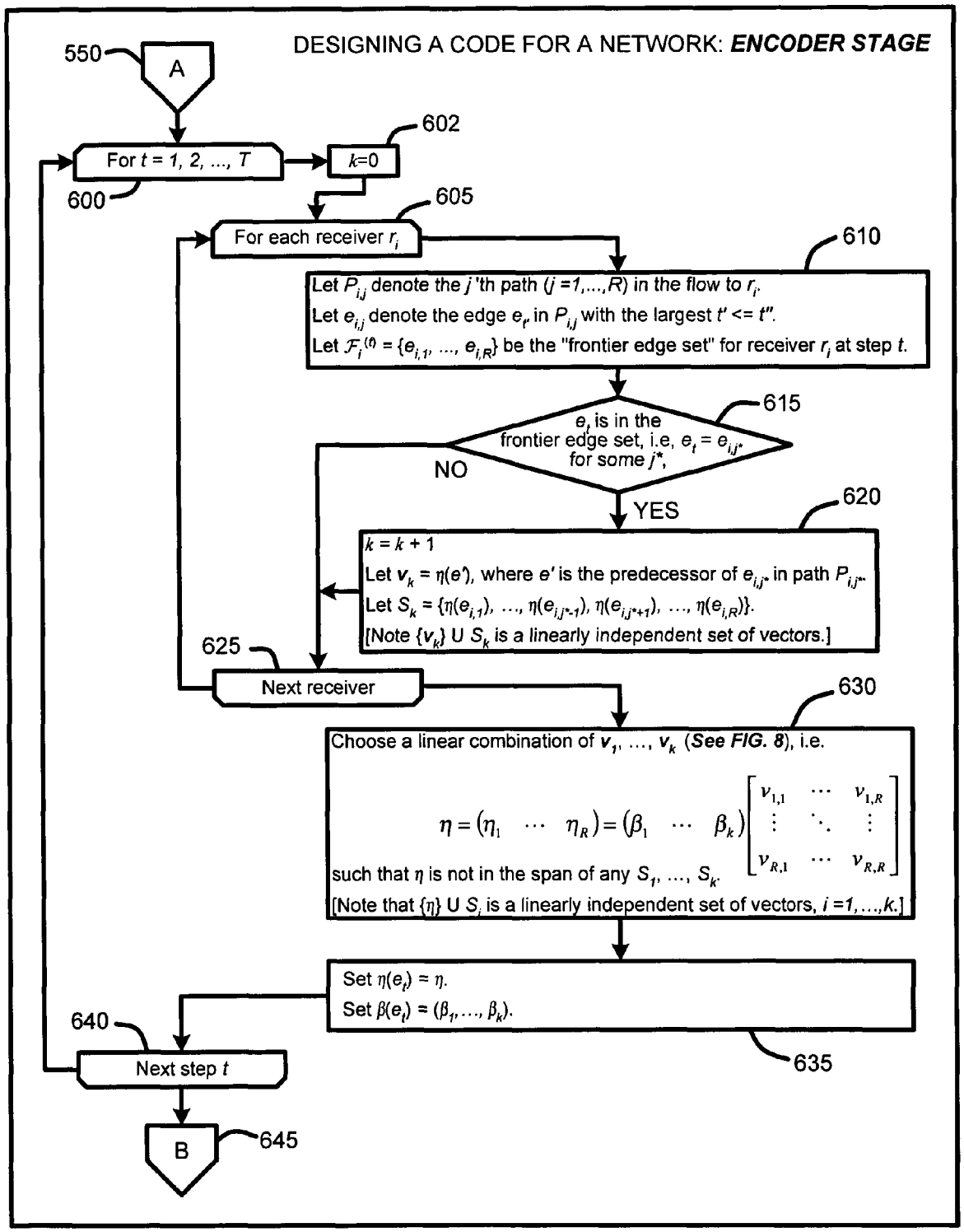
FIG. 6 illustrates an exemplary system flow diagram of an encoder design stage for automatically designing a code for a network.

As illustrated by FIG. 6, the process continues (see box A (550) in FIG. 5 and FIG. 6) by computing encoding vectors $\beta(e_t)$ for the network code constructor in an "encoder design stage." First, the total number of edges T representing the edges, $e_1, \ldots, e_T$, computed in the initialization stage, is used as a counter 600 for computing the encoding vectors $\beta(e_t)$ for each edge in a nested loop. In particular, for each t={1, 2, ..., T} 600, a counter k is initialized to zero 602. This counter k serves to keep track of the number of receivers whose flows use edge $e_t$. Next, for each receiver $r_i$ 605, the processes for computing the aforementioned frontier edge set for each receiver are initialized 610 by defining $P_{i,j}$ as the $j^{th}$ path (j=1, ..., R) in the flow to $r_i$; defining $e_{i,j}$ as the edge $e_t$ in $P_{i,j}$ with the largest t'=t; and defining $\mathcal{F}_i^{(t)} = \{e_{i,1}, \ldots, e_{i,R}\}$ as the "frontier edge set" for receiver $r_i$ at step t.

Next, a determination 615 is made as to whether the current et is in the frontier edge set, $\mathcal{F}_i^{(t)}$, i.e., $e_t = e_{i,j^*}$ for some j*. If $e_t$ is in $\mathcal{F}_i^{(t)}$ then, as illustrated in box 620, the counter k is incremented by 1 to indicate that the current edge $e_t$ is used by the current receiver $r_i$. Further, if $e_t$ is in $\mathcal{F}_i^{(t)}$, then $v_k = \eta(e')$, where e' is the predecessor of $e_{i,j^*}$ in path $P_{i,j^*}$; further, $S_k = \{\eta(e_{i,t}), \ldots, \eta(e_{i,j^*-1}), \eta(e_{i,j^*+1}), \ldots, \eta(e_{i,R})\}$, where $\{v_k\} \cup S_k$ is a linearly independent set of vectors. Then, whether or not et is in $\mathcal{F}_i^{(t)}$, i is incremented for selecting the next receiver 625. This process (steps 605 through 625) repeats until all i receivers for the current edge t have been processed.

Next, as illustrated in box 630, a linear combination of $v_1, \ldots, v_k$ is chosen 630 such that $\eta$ is not in the span of any $S_1, \ldots, S_k$, where $\{\eta\} \cup S_i$ is a linearly independent set of vectors for i=1, ..., k. Note that this process for choosing a linear combination of $v_1, \ldots, v_k$ 630 is illustrated in greater detail with respect to FIG. 8, as described below. Next, as illustrated in box 635, $\eta(e_t)$ is set equal to $\eta$, and $\beta(e_t)$ is set equal to $(\beta_1, \ldots, \beta_k)$. Then, after setting $\eta(e_t)$ and $\beta(e_t)$ 635, t is incremented for selecting the next edge 640. This process (steps 600 through 640) repeats until all T edges have been processed. This step completes the encoder design stage of the network code constructor.

Figure 7:
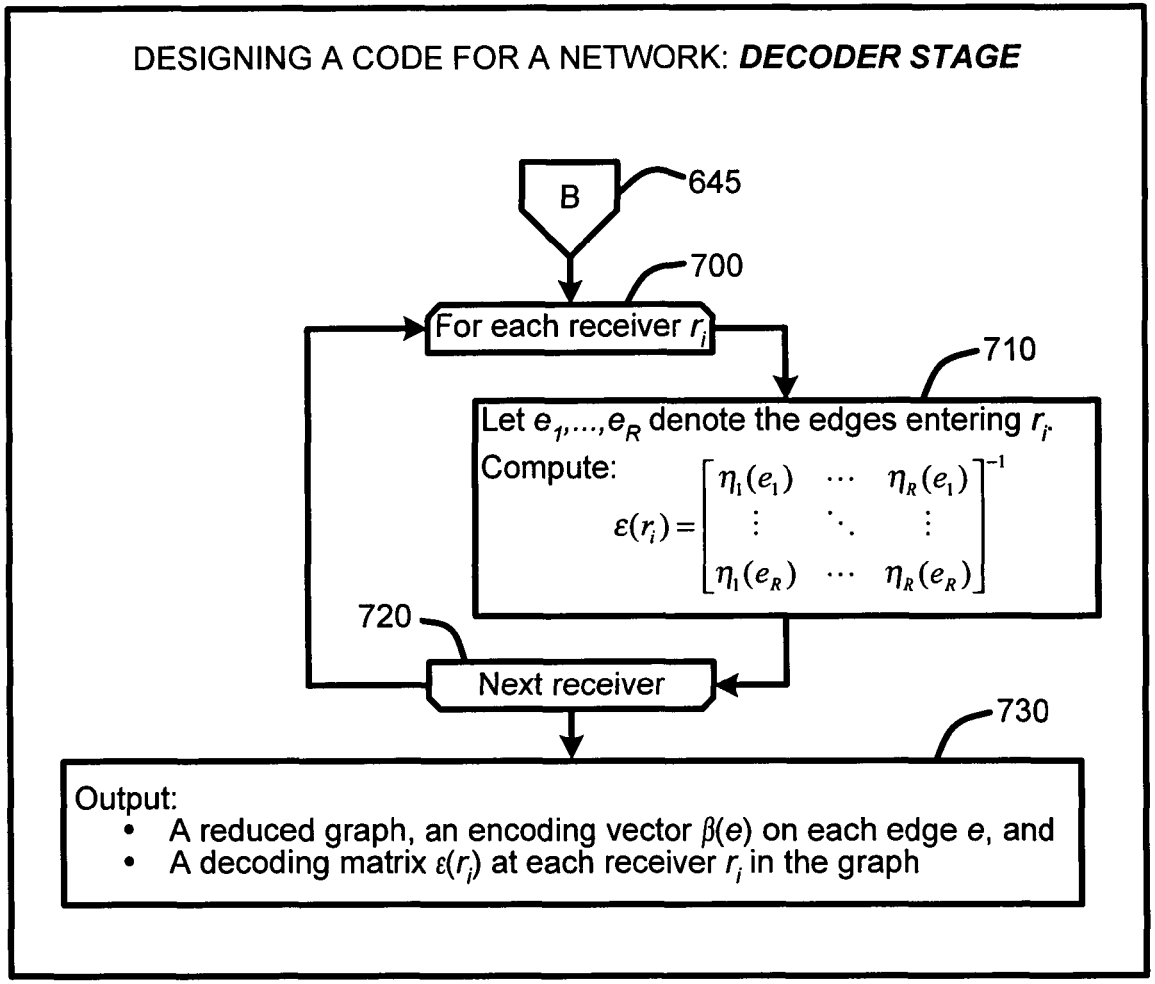
FIG. 7 illustrates an exemplary system flow diagram of a decoder design stage for automatically designing a code for a network.

As illustrated by FIG. 7, the process continues (see box B (645) in FIG. 6 and FIG. 7) in a "decoder design stage" by computing a matrix of decoding vectors $\epsilon(r_i)$ at each receiver $r_i$ and outputting these decoding vectors along with a reduced directed acyclic graph (representing the multicast network) having an encoding vector, $\beta(e)$ on each edge. First, for each receiver $r_i$ 700, $\epsilon(r_i)$ is determined by computing 710 a corresponding inverse matrix of decoding vectors $\epsilon(r_i)$ as illustrated by Equation 11 which follows from Equation 10 as described above in Section 3.3.2:

$$\varepsilon(r_i) = \begin{bmatrix} \eta_1(e_1) & \cdots & \eta_R(e_1) \\ \vdots & \ddots & \vdots \\ \eta_1(e_R) & \cdots & \eta_R(e_R) \end{bmatrix}^{-1} \quad \text{Eqn. 11}$$

This process loops while incrementing 720 the current receiver $r_i$ until all receivers have been processed. Once all of the receivers have been processed (700 through 720), then the network code constructor outputs 730 the decoding vectors $\epsilon(r_i)$ along with a reduced directed acyclic graph (representing the multicast network) having an encoding vector, $\beta(e)$ on each edge.

3.4.2 Choosing a Linear Combination of Vectors:

As noted above with respect to Box 630 of FIG. 6, FIG. 8 illustrates the process for choosing a linear combination of $v_1, \ldots, v_k$ such that $\eta$ is not in the span of any $S_1, \ldots, S_k$, where $\{\eta\} \cup S_i$ is a linearly independent set of vectors for $i=1, \ldots, k$.

In particular, as illustrated by FIG. 8, the linear combination of $v_1, \ldots, v_k$ is chosen by first inputting the R-dimensional row vector $v_k$ and the set of R-1 R-dimensional vectors $S_i$ for $i=1, \ldots, k$ 800. Next, denoting by L the vector space spanned by $v_i$ for $i=1, \ldots, k$, the set of vectors $v_i$ is computed for $i=1, \ldots, k'$, spanning L, where k' is less than or equal to k 810. In the next step, for $j=1, \ldots, k$ a vector $Z_j$ is computed by Gaussian elimination in L such that for any vector y in $S_j$, $y.S_j=0$ (Box 820).

Once the vector $Z_j$ has been computed 820, the next step is to use this information to find a vector v in L such that $v.Z_j \neq 0$ for $j=1, \ldots, k$ 830. Further, in finding this vector v in L it is assumed that vectors $Z_j$, $j=1, \ldots, k''$, are linearly independent and that all other $Z_j$, $j=k''+1, \ldots, k$, can be written as linear combinations of these vectors. In the next step (Box 840), v is determined by finding a linear combination of vectors $c_j$ for $j=1, \ldots, k''$ by solving a system of linear equations denoted by $v.Z_j=c_j$ for $j=1, \ldots, k''$. Note that the solution to this equation may not be unique, and that one of the solutions may be calculated by Gaussian elimination. Finally, once this system of linear equations has been solved 840, an output of k coefficients $\beta_1, \ldots, \beta_k$ and the R-dimensional vector $\eta = \sum_{i=1}^{k} \beta_i v_i$ is provided. This output is then provided to Box 625 of FIG. 6 as noted above.

Figure 9:
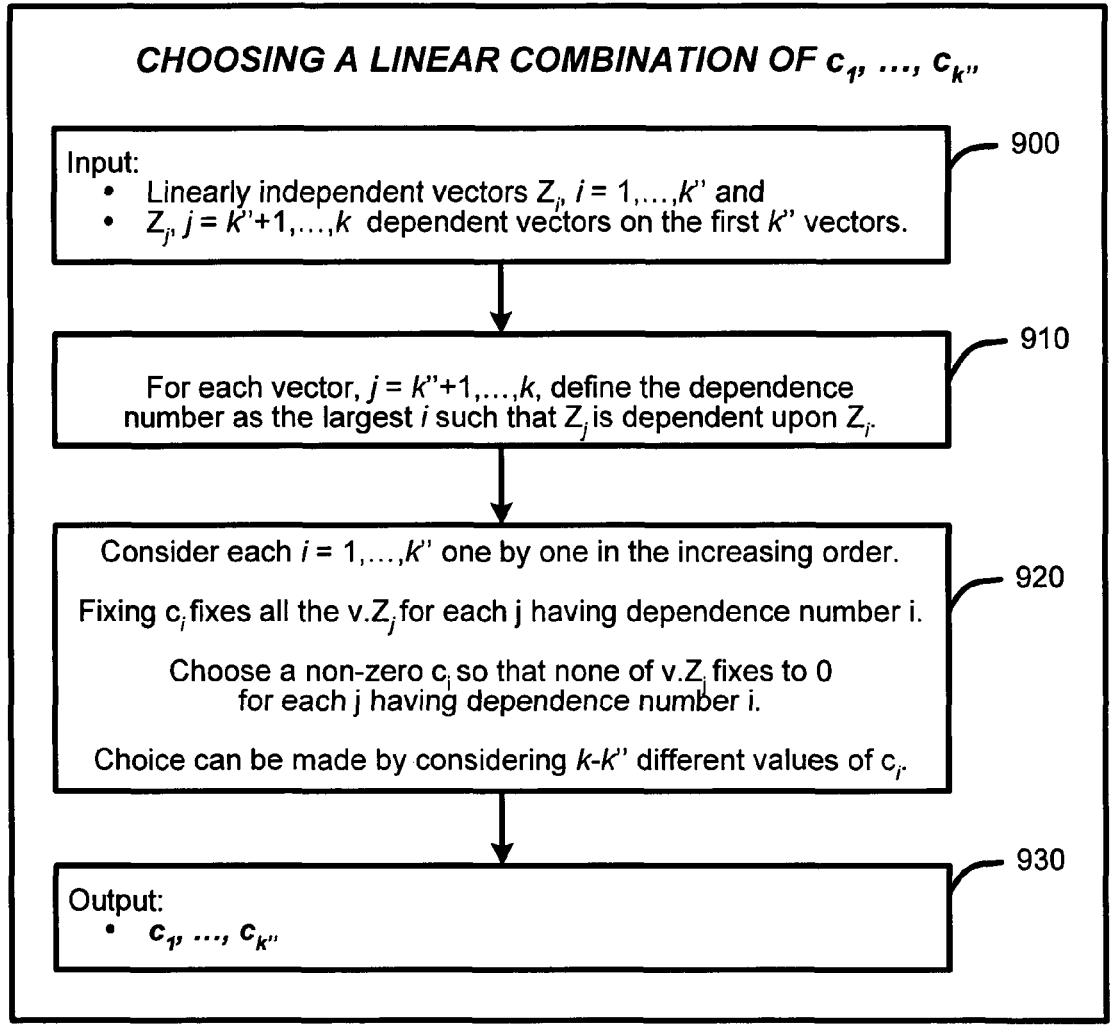
FIG. 9 illustrates an exemplary system flow diagram for automatically choosing a linear combination of vectors for use in a greedy algorithm utilized by the network code constructor.

In addition, the step illustrated by Box 840 (finding a linear combination of vectors $c_j$ for $j=1, \ldots, k''$) is further described with respect to FIG. 9. In particular, as illustrated by FIG. 9, finding a linear combination of vectors $c_j$ for $j=1, \ldots, k''$ begins by inputting the linearly independent vectors $Z_i$, $i=1, \ldots, k''$, and $Z_j$, $j=k''+1, \ldots, k$ dependent vectors on the first k'' vectors 900.

Next, for each vector, $j=k''+1, \ldots, k$, a dependence number is defined as the largest i such that $Z_j$ is dependent upon $Z_i$ 910. Then, as illustrated by Box 920, for each $i=1, \ldots, k''$, $c_i$ is fixed, thereby fixing all of the $v.Z_j$ for each j having a dependence number i. Further, a non-zero $c_i$ is then chosen so that none of the $v.Z_j$ fixes to zero for each j having a dependence number i. This choice is easily made by simply considering k-k'' different values of $c_i$ to identify the proper selection of each $c_i$. Having made this selection 920, $c_1, \ldots, c_k$ is output 930. As noted above, this output is provided to Box 840 of FIG. 8.

3.5 Multicasting Symbols from the Sender to Every Receiver:

Once the aforementioned encoding vector and decoder matrix have been computed for the multicast network, then they can be used for transmitting symbols across the network from the sender to be decoded by each receiver. This process is illustrated by FIG. 10.

Figure 10:
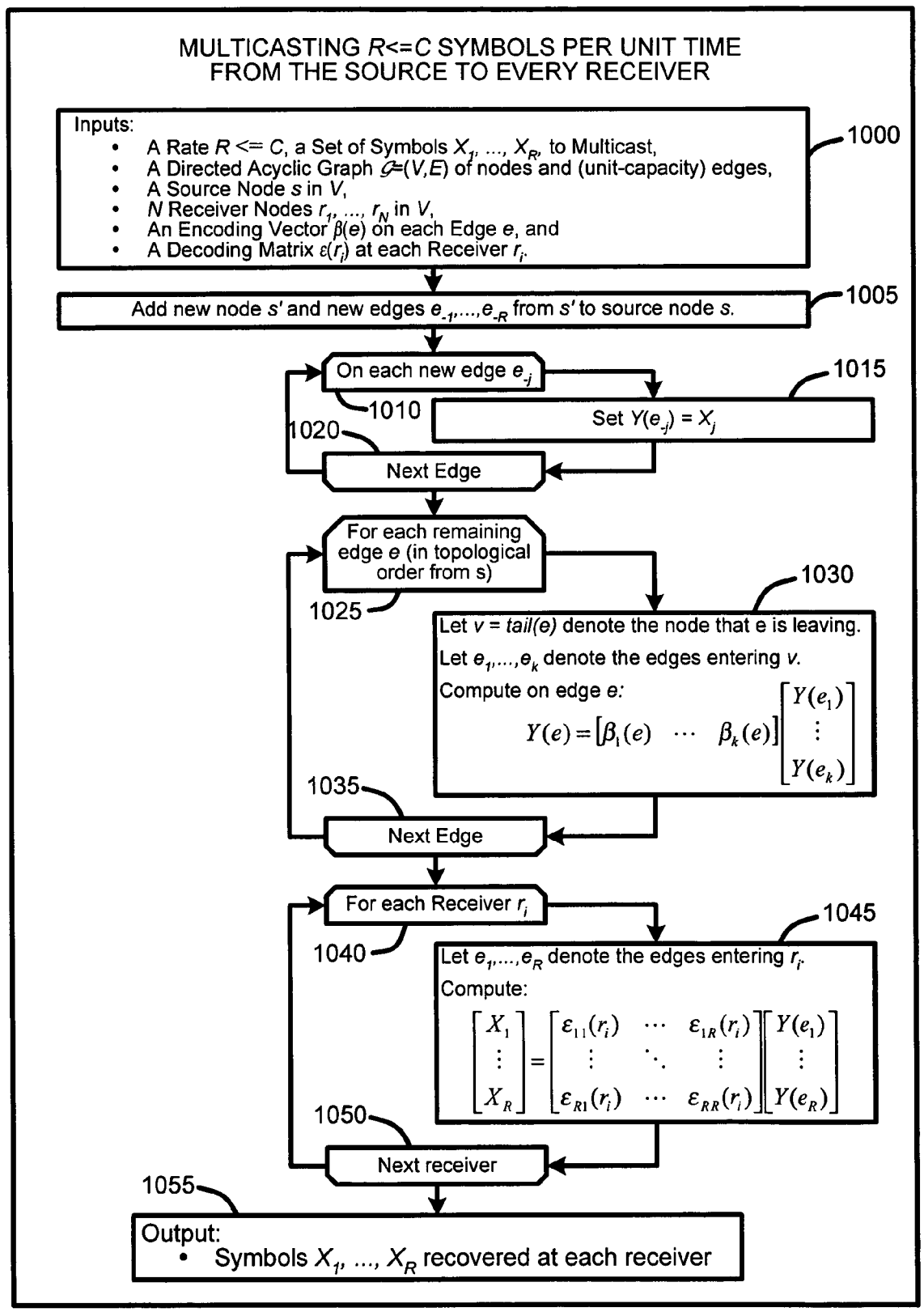
FIG. 10 illustrates an exemplary system flow diagram for automatically multicasting symbols from a source to every receiver using network coding generated by the network code constructor, as illustrated in FIG. 3 through FIG. 9.

In general, as illustrated by FIG. 10, the multicast network coder (i.e., the encoder and decoder) allows for the efficient multicasting of a set of symbols from the source to every receiver in a multicast network. The inputs used to produce this multicasting include a rate $R \leq C$, a set of symbols $X_1, \ldots, X_R$ to be multicast, a directed acyclic graph $\mathcal{G}=(V,E)$ of nodes and (unit-capacity) edges, a source node s in V, N receiver nodes $r_1, \ldots, r_N$ in V, an encoding vector $\beta(e)$ on each edge e, and a decoding matrix $\in(r_i)$ at each receiver $r_i$ (Box 1000). Given these inputs 1000, the next step is to create a new node denoted by s', and new edges denoted by $e_{-1}, \ldots, e_{-R}$ from s' to the known source node s 1005. Next, for each new edge $e_{-j}$ 1010, an input symbol $Y(e_{-j})$ is set equal to $X_j$. This process is repeated for each new edge 1020 until all new edges have been processed.

Then, in topological order from s for each remaining edge e 1025, Y(e) is computed on edge e 1030 by defining v=tail(e) as denoting the node that e is leaving, and defining $e_1, \ldots, e_k$ as denoting the edges entering v. Given these definitions, the computation of Y(e) 1030 is accomplished by evaluating the following expression, derived from Equation (1):

$$Y(e) = [\beta_1(e) \cdots \beta_k(e)] \begin{bmatrix} Y(e_1) \\ \vdots \\ Y(e_k) \end{bmatrix} \qquad \text{Eqn. 12}$$

This process (1025 through 1035) is repeated for each remaining edge 1035 until all of the remaining edges have been processed, thereby encoding the input symbol $Y(e_{-j})$ being multicast by the sender.

Next, for each receiver, $r_i$ 1040, the symbols $X_1, \ldots, X_R$ are computed 1045 by evaluating the following expression, derived from Equation 4:

$$\begin{bmatrix} X_1 \\ \vdots \\ X_R \end{bmatrix} = \begin{bmatrix} \varepsilon_{11}(r_i) & \cdots & \varepsilon_{1R}(r_i) \\ \vdots & \ddots & \vdots \\ \varepsilon_{R1}(r_i) & \cdots & \varepsilon_{RR}(r_i) \end{bmatrix} \begin{bmatrix} Y(e_1) \\ \vdots \\ Y(e_R) \end{bmatrix} \qquad \text{Eqn. 13}$$

This process (1040 through 1045) is repeated for each receiver, $r_i$ 1050, until all of the receivers have been processed.

Finally, having computed the symbols $X_1, \ldots, X_R$ at each receiver 1045 those symbols are output 1055, thereby completing the multicast from the sender to all of the receivers by having decodes the symbol multicast from the sender to all of the receivers.

In conclusion, it should again be noted that although the network code constructor described herein is presented in terms of a low complexity process for computing multicast codes for networks in an information theoretically optimal manner, the ideas described herein are easily extensible for obtaining algebraic codes over small finite fields for more general networks, networks with delays and robust networks.

The foregoing description of the invention has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the audio challenger described herein. It is intended that the scope of the invention be limited not by this detailed description, but rather by the claims appended hereto.

What is claimed is:

1. A system for computing a network code, comprising:
   a network having a sender node, one or more interior nodes, and one or more receiver nodes, each node having one or more edges connecting to one or more interior nodes in the network;
   means for computing a set of linear combination coefficients for each edge entering each node, each set of linear combination coefficients representing an encoding vector for each edge for encoding symbols transmitted along each corresponding edge;

wherein each symbol provides a symbolic representation of one or more encoded bits of data, and wherein each symbol belongs to a finite library of symbols;

means for computing a decoding vector for each edge exiting each interior network node from the linear combination coefficients of the edges entering each node, wherein each decoding vector is used for decoding symbols transmitted along each corresponding edge;

means for computing decoding matrices for each receiver node of the network from the decoding vectors; and means for constructing a network code for at least a portion of the network, including the sender node, each interior node, and one or more of the receiver nodes, from the corresponding linear combination coefficients, the corresponding decoding vectors and the corresponding decoding matrices.

2. The system of claim 1 further comprising means for allowing each receiver node to use a corresponding one of the decoding matrices to decode data transmitted from the sender node, to the receiver node across a plurality of edges of the network between the sender node and the receiver node.

3. The system of claim 1 wherein computing the linear combination coefficients further includes means for ensuring that the encoding vectors for the symbols transmitted across edges on a cut between the sender and each receiver are full rank, such that the rank of each encoding vector is the same as the smallest dimension of that vector.

4. The system of claim 1 wherein a size of the finite library of symbols is independent of the rate of a rate of computed flows between the network nodes.

5. The system of claim 1 further comprising an initialization stage performed prior to computing the set of linear combination coefficients, wherein a representation of the network is reduced to a network with edges between interior nodes having unit capacities by replacing each edge having a capacity c with c edges having unit capacity.

6. The system of claim 5 wherein the initialization stage further comprises:

a determination of whether each edge having unit capacity is within flows computed between the sender node and the receiver nodes; and topologically ordering any edges within the computed flows from the sender node to the one or more receiver nodes.

7. The system of claim 6 wherein the topologically ordered edges are used for computing the sets of linear combination coefficients representing each encoding vector.

8. The system of claim 6 wherein the topologically ordered edges are used for computing the decoding matrices.

9. A computer-implemented process, including computer executable instructions stored on a physical computer-readable medium, for computing a network code for a network including at least one sender, a plurality of internal nodes and at least one receiver, comprising the steps of:

computing a set of one or more linear combination coefficients for each interior network node and the at least one sender, wherein each set of linear combination coefficients represents a corresponding encoding vector for encoding symbols exiting a corresponding one of the sender and the internal nodes;

computing decoding vectors for symbols exiting each interior network node from the linear combination coefficients corresponding to each interior network node;

computing decoding matrices for each receiver from the decoding vectors of all internal nodes of the network; and constructing a network code from the linear combination coefficients, the decoding vectors and the decoding matrices.

10. The computer-implemented process of claim 9 further comprising allowing each receiver to use a corresponding one of the decoding matrices to decode data transmitted across a path through one or more of the interior nodes between the at least one sender and the at least one receiver.

11. The computer-implemented process of claim 9 wherein computing the linear combination coefficients further includes ensuring that the encoding vectors for symbols transmitted across edges on a cut between the at least one sender and each receiver are full rank, such that the rank of each encoding vector is the same as the smallest dimension of that vector.

12. The computer-implemented process of claim 9 further comprising an initialization stage performed prior to computing the set of linear combination coefficients, wherein a representation of the network is reduced to a network with edges between interior nodes having unit capacities by replacing each edge having a capacity c with c edges having unit capacity.

13. The computer-implemented process of claim 12 wherein the initialization stage further comprises:

a determination of whether each edge having unit capacity is within flows computed between the at least one sender and the at least one receiver; and topologically ordering any edges within the computed flows from the at least one sender to the at least one receiver.

14. The computer-implemented process of claim 13 wherein the topologically ordered edges are used for computing the sets of linear combination coefficients representing each encoding vector.

15. The computer-implemented process of claim 13 wherein the topologically ordered edges are used for computing the decoding matrices.

\* \* \* \* \*